US012798498B2

(12) United States Patent
Kim et al.

(10) Patent No.: US 12,798,498 B2
(45) Date of Patent: Nov. 17, 2026

(54) STRUCTURE FOR HARD FLOOR OF VEHICLE

(71) Applicants: Hyundai Motor Company, Seoul (KR); Kia Corporation, Seoul (KR)

(72) Inventors: Young Ho Kim, Suwon-si (KR); Jong Chan Kim, Bucheon-si (KR); Chang Mo Seong, Suwon-si (KR); Hyo Keun Kim, Suwon-si (KR); Chun Gyun Oh, Seoul (KR); Hyo Chul Myoung, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 392 days.

(21) Appl. No.: 18/538,509

(22) Filed: Dec. 13, 2023

(65) Prior Publication Data

US 2025/0074337 A1 Mar. 6, 2025

(30) Foreign Application Priority Data

Sep. 6, 2023 (KR) ........................ 10-2023-0118059

(51) Int. Cl.
*B60R 13/08* (2006.01)
*B62D 25/08* (2006.01)
*B62D 25/20* (2006.01)

(52) U.S. Cl.
CPC ........ *B60R 13/0815* (2013.01); *B62D 25/087* (2013.01); *B62D 25/2009* (2013.01)

(58) Field of Classification Search
CPC .................................................... B60N 2/0725
USPC ........... 296/65.13, 193.07, 39.3, 187.07, 204
See application file for complete search history.

(56) References Cited

U.S. PATENT DOCUMENTS

| | | | | |
|---|---|---|---|---|
| 5,104,176 | A | 4/1992 | Mrozowski | |
| 5,501,289 | A * | 3/1996 | Nishikawa | B60K 1/04 280/783 |
| 5,849,122 | A * | 12/1998 | Kenmochi | B60R 13/0815 296/191 |
| 5,979,684 | A * | 11/1999 | Ohnishi | B62D 29/045 220/62.19 |
| 6,039,386 | A * | 3/2000 | Hasshi | B62D 25/2036 296/205 |
| 6,138,580 | A * | 10/2000 | Thoman | B29C 70/865 105/396 |
| 6,685,250 | B2 | 2/2004 | Misaji et al. | |
| 7,017,980 | B1 * | 3/2006 | Bejin | B60R 5/04 296/193.07 |

(Continued)

FOREIGN PATENT DOCUMENTS

| | | | | |
|---|---|---|---|---|
| CN | 111845959 | A * | 10/2020 | B60Q 3/78 |
| DE | 102006052601 | A1 * | 5/2008 | B62D 25/20 |
| KR | 20170089328 | A | 8/2017 | |

OTHER PUBLICATIONS

Translation of CN 111845959 (Year: 2020).*
Translation of DE 102006052601 (Year: 2008).*

*Primary Examiner* — Amy R Weisberg
*Assistant Examiner* — Veronica M Condo
(74) *Attorney, Agent, or Firm* — Slater Matsil, LLP

(57) ABSTRACT

An embodiment hard floor structure for a vehicle includes a bracket fastened to a floor panel, a hard cover positioned on a top surface of the bracket, the hard cover comprising cover cells that are plate-shaped and exposed to a vehicle interior, and a sound-absorbing material disposed between the bracket and the floor panel.

20 Claims, 10 Drawing Sheets

(56) References Cited

U.S. PATENT DOCUMENTS

| | | | | |
|---|---|---|---|---|
| 7,520,554 | B2 * | 4/2009 | Brown | B60N 2/753 296/68.1 |
| 7,862,101 | B2 | 1/2011 | Lusk et al. | |
| 8,424,463 | B2 * | 4/2013 | Tada | B32B 27/42 105/396 |
| 9,227,582 | B2 * | 1/2016 | Katayama | H01M 50/24 |
| 9,399,413 | B2 | 7/2016 | Phinney | |
| 10,166,737 | B2 * | 1/2019 | Kwon | B32B 5/028 |
| 10,661,646 | B2 * | 5/2020 | Matecki | B60L 50/66 |
| 10,967,912 | B2 * | 4/2021 | Toyota | B62D 21/157 |
| 11,524,606 | B2 * | 12/2022 | Lee | B60L 50/66 |
| 11,541,942 | B2 * | 1/2023 | Ohtake | B62D 47/00 |
| 11,975,601 | B2 * | 5/2024 | Nabuchi | B62D 25/2072 |
| 2006/0101754 | A1 | 5/2006 | Risi | |
| 2009/0243322 | A1 * | 10/2009 | Vance | B60N 3/046 296/39.1 |
| 2011/0006562 | A1 * | 1/2011 | Campbell | B60R 13/01 296/193.04 |
| 2017/0212633 | A1 | 7/2017 | You et al. | |
| 2024/0217590 | A1 | 7/2024 | Oh et al. | |

* cited by examiner

SEC D-D

STRUCTURE FOR HARD FLOOR OF VEHICLE

CROSS-REFERENCE TO RELATED APPLICATIONS

This application claims the benefit of Korean Patent Application No. 10-2023-0118059, filed on Sep. 6, 2023, which application is hereby incorporated herein by reference.

TECHNICAL FIELD

The present disclosure relates to a structure for a hard floor of a vehicle.

BACKGROUND

In order to enhance its rigidity against twisting, a subframe is joined to a vehicle chassis that is a structural frame. Furthermore, to reduce weight, various components, which have different shapes and are made from different materials, are mounted on the vehicle body. In this manner, vehicle chassis have been developed with changes in structure. The term vehicle chassis collectively refers to essential components other than the vehicle body (vehicle frame), such as a powertrain, a steering apparatus, a suspension, and a drive shaft, as well as a frame for supporting these components.

These structures are all structures developed according to characteristics of internal combustion engines and are based on a fossil-fuel energy source and the powertrain that includes an engine, a clutch, a gear reducer, and the like. For positioning, a floor panel in a vehicle interior and a floor mat structure surrounding the floor panel are required to have respective bent structures that accommodate the shape of the vehicle chassis on which the powertrain is mounted.

However, in recent years, research has been conducted on electric powertrains that use batteries. In addition, autonomous traveling technologies have been developed that use LIDAR components, cameras, and the like during vehicle travel. With developments in vehicle autonomous traveling, vehicle marketing strategies are expected to focus on "convenience and residential-like comfortability during vehicle travel," instead of "driving pleasure" or "vehicle traveling performance." Correspondingly, a plate-shaped floor structure is required in order to provide various types of convenience within the in-vehicle space.

Korean Patent Application Publication No. 10-2017-0089328 may provide information related to the subject matter of the present disclosure.

SUMMARY

The present disclosure relates to a structure for a hard floor of a vehicle. Particular embodiments relate to a hard floor structure of a vehicle that includes a hard cover unit that serves as a vehicle floor, the hard floor structure being a type of flat floor structure in the shape of a plate.

An embodiment of the present disclosure provides a flat floor including a plate-shaped hard cover unit.

Another embodiment of the present disclosure provides a hard cover unit including cover cells and a vehicle hard floor structure including a unit that is positioned between the cover cells and performs various functions.

The embodiments of the present disclosure are not limited to the above-mentioned embodiments. An embodiment not mentioned above could be clearly understandable by embodiments of the present disclosure in the following detailed description. In addition, the embodiments of the present disclosure can be accomplished by limitations recited in the claims or combination thereof.

In order to accomplish the embodiments of the present disclosure, the vehicle hard floor structure has the following configurations.

According to an embodiment of the present disclosure, there is provided a vehicle hard floor structure including a bracket unit fastened to a floor panel, a hard cover unit configured as cover cells that are plate-shaped, positioned on the top of the bracket unit, and exposed to a vehicle interior, and a sound-absorbing material positioned between the bracket unit and the floor panel.

The vehicle hard floor structure may further include a clipping unit positioned on a region of a door scuff that the bracket unit faces.

In the vehicle hard floor structure, the door scuff may include a soft portion configured to surround at least one portion of an upper surface of the hard cover unit.

In the vehicle hard floor structure, the bracket unit may include a first bracket positioned on a region corresponding to a driver seat, a second bracket positioned on a region corresponding to a passenger seat, a third bracket positioned on a region corresponding to a seat in back of the driver seat, and a fourth bracket positioned on a region corresponding to a seat in back of the passenger seat.

In the vehicle hard floor structure, the hard cover unit may include a center molding portion positioned in a center groove by being inserted thereinto, the center groove being formed between the first bracket and the second bracket and between the third bracket and the fourth bracket.

In the vehicle hard floor structure, the hard cover unit further may include an end cover positioned in an end groove by being inserted thereinto, the end groove being formed between the first bracket and the second bracket that are positioned under a front seat and being formed between the third bracket and the fourth bracket that are positioned under a rear seat.

The vehicle hard floor structure may further include a watertight portion, the center molding portion being positioned on both end portions, facing the bracket units, of the watertight portion in such a manner as to be positioned adjacent lateral surfaces of the bracket units.

The vehicle hard floor structure may further include a watertight portion, the end cover being positioned on both end portions, facing the bracket units, of the watertight portion in such a manner as to be positioned adjacent lateral surfaces of the bracket units.

The vehicle hard floor structure may further include at least one first position fixation rod positioned on a position, facing the bracket unit, on the floor panel, at least one second position fixation rod positioned on a position at which the bracket unit faces the door scuff, and a position regulation portion positioned on the bracket unit that is fastened to the at least one first position fixation rod and the at least one second position fixation rod.

In the vehicle hard floor structure, the position fixation rod may be configured to be inserted into the position regulation portion of the first bracket and the position regulation portion of the second bracket in an overlapping manner.

In the vehicle hard floor structure, the position regulation portion, open at one end thereof, that is fastened to the first position fixation rod may move in a sliding manner for fastening.

In the vehicle hard floor structure, the position regulation portion that is fastened to the second position fixation rod may be configured as a longitudinal hole along a lengthwise direction of the vehicle.

The vehicle hard floor structure may further include a handle positioned on both ends of the bracket unit.

In the vehicle hard floor structure, the bracket unit and the floor panel may be coupled to each other in a hook-and-loop fastening manner.

In the vehicle hard floor structure, the sound-absorbing material may be formed of expanded polypropylene.

The vehicle hard floor structure may further include a recess portion positioned in a lower portion of the hard cover unit and an opening portion positioned, as at least one portion of the hard cover unit, on the top of the recess portion.

The vehicle hard floor structure may further include a ramp positioned between the bracket unit and the floor panel and extending out of a vehicle.

According to embodiments of the present disclosure, the following advantageous effects are obtained through the embodiments described above and through configurations, combinations, and application-based relationships that will be described below.

According to embodiments of the present disclosure, an advantageous effect can be achieved by providing sufficient rigidity and a vehicle interior environment through the use of the vehicle hard floor structure that includes the hard cover unit and is capable of providing a flat floor.

In addition, according to embodiments of the present disclosure, an advantageous effect can be achieved by providing sufficient rigidity to endure loads applied to the floor through the use of various bracket structures for supporting the hard cover unit.

In addition, according to embodiments of the present disclosure, an advantageous effect of improving the aesthetic appeal of the vehicle interior can be achieved by providing the hard cover unit including a multiplicity of cover cells.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the embodiments of the present disclosure, and wherein.

DETAILED DESCRIPTION OF ILLUSTRATIVE EMBODIMENTS

Figure 1:
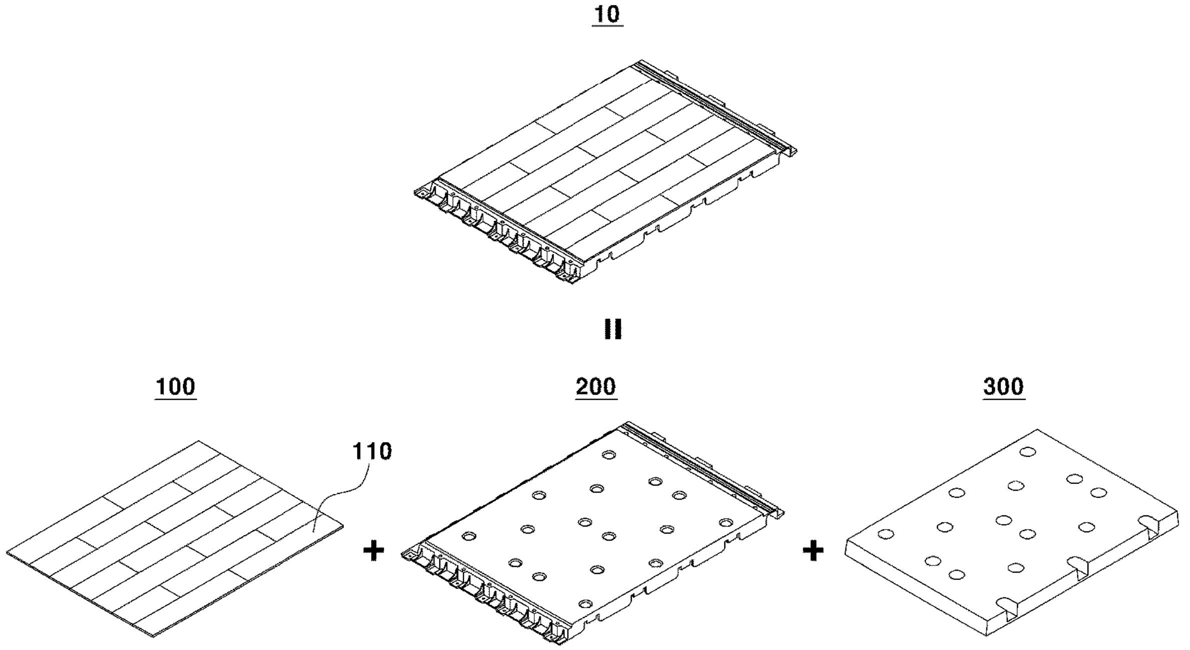
FIG. 1 is a view illustrating a configuration of a vehicle hard floor structure according to an embodiment of the present disclosure.

Embodiments of the present disclosure will be described in more detail below with reference to the accompanying drawings. The embodiments of the present disclosure may be modified in various forms, and the scope of the present disclosure should not be interpreted as being limited to the following embodiments. The embodiments are described in sufficient detail to enable a person of ordinary skill in the art to make and use the present disclosure.

The term "unit," "module," or the like, which is used throughout the specification, means an individual component that performs at least one function or operation and may be realized in hardware, software, or a combination of both.

The terms used in the present specification are only for describing a specific embodiment and are not intended to impose any limitation on the present disclosure. A noun in singular form has the same meaning as when used in its plural form, unless it has a different meaning in context.

In addition, in order to distinguish among constituent elements that have the same name, the terms first, second, and so on are used throughout the present specification. In the following description, no limitation is necessarily imposed to the order of the terms.

In addition, through the present specification, a "driver seat" refers to a front seat adjacent to one lateral side of a vehicle, and a "passenger seat" refers to a front seat adjacent to the opposite lateral side.

Various embodiments throughout the present specification are described with reference to the accompanying drawings. The embodiments and terms used to describe them are not intended to limit the present disclosure, and various modifications, equivalents, and/or substitutions should be construed to fall within the scope of the present disclosure. Like reference numbers may be assigned to like constituent elements for description with reference to the drawings. An expression in the singular may be construed as that in the plural, except as otherwise distinctively expressed in context. Throughout the present specification, the expression such as "A or B" or "at least one of A and/or B" may be construed to include all possible combinations of A and B.

The terms such as "first," "second," and so forth may be placed before constituent elements, regardless of the order or importance of them. These terms are only used to distinguish from one constituent element to another and do not impose any limitation on the meanings of the constituent elements. A constituent element (a first constituent element), when mentioned as being "connected" or "having access" to a different constituent element (a second constituent element), may be directly connected to the different constituent or may be connected to the different constituent element with a third constituent element in between.

The embodiments will be described in detail below with reference to the accompanying drawings. The same reference numbers are assigned to the same constituent elements or to constituent elements that correspond to each other. The same description thereof is not repeated.

According to embodiments of the present disclosure, a vehicle hard floor structure 10 is provided. This hard material structure is employed for a floor exposed to a rear interior surface of a vehicle.

FIG. 1 is a view illustrating a configuration of the vehicle hard floor structure 10 according to an embodiment of the present disclosure.

The vehicle hard floor structure 10 includes a bracket unit 200 that is positioned on a floor panel 900. The bracket unit 200 and the floor panel 900 may be fixed by welding or in a bolt fastening manner. Furthermore, the bracket unit 200 according to an embodiment of the present disclosure may be fixed to the floor panel 900 by being coupled thereto in a hook-and-loop fastening manner.

More preferably, in an embodiment of the present disclosure, the bracket unit 200, the floor panel 900, and a sound-absorbing material 300 may be fastened to each other with a belt.

Furthermore, the vehicle hard floor structure 10 includes the sound-absorbing material 300 that is positioned between the bracket unit 200 and the floor panel 900. The sound-absorbing material 300 is positioned under the bracket unit 200 in a manner that corresponds to a shape of the bracket unit 200, but between the floor panel 900 and the bracket unit 200. The sound-absorbing material 300 may be formed of polyurethane (PU). In addition, in an embodiment of the present disclosure, the sound-absorbing material 300 may be formed of a combination of expanded polypropylene (EPP) and polyurethane. The sound-absorbing material 300 formed of expanded polypropylene may be positioned in the shape of an insert inside the bracket unit 200. Furthermore, the sound-absorbing material 300 may further include a felt material.

The sound-absorbing material 300 may be formed of a combination of expanded polypropylene and polyurethane. In this case, expanded polypropylene may be formed by being insert-injected into polyurethane.

The vehicle hard floor structure 10 according to an embodiment of the present disclosure includes a hard cover unit 100 that is positioned on an upper surface of the bracket unit 200. The hard cover unit 100 may be configured as at least one cover cell 110. The cover cell 110 may be configured as one block along the lengthwise direction of the vehicle or may be configured as one block along the widthwise direction of the vehicle. The bracket unit 200 and the hard cover unit 100 may be fastened to each other using a double-sided non-woven fabric tape. Furthermore, the bracket unit 200 and the cover cell 110 of the hard cover unit 100 employ stud and nut fastening structures, respectively, and thus may be fixed to each other using the structures.

In addition, the bracket unit 200 and the sound-absorbing material 300 may be fastened to each other in a hook-and-loop fastening manner and, additionally, may further include a bolt-nut fastening structure.

In an embodiment of the present disclosure, the cover cell 110 may be configured as a single cover cell 110 that is positioned on each of the upper surfaces of first to fourth brackets.

Furthermore, in an embodiment of the present disclosure, the hard cover unit 100 includes a multiplicity of cover cells 110 that are fixedly positioned on the upper surface of the bracket unit 200 along the lengthwise direction of the vehicle. More preferably, the bracket unit 200 may be configured as a multiplicity of brackets. The cover cells 110, which are positioned on the upper surfaces, respectively, of the brackets, may have the same directionality and size.

The cover cell 110 according to an embodiment of the present disclosure may have various patterns such as a wood pattern and a marble pattern and may be formed of various materials. Furthermore, a user may select a pattern of the cover cell 110 from among a multiplicity of patterns.

The bracket unit 200 according to an embodiment of the present disclosure may be manufactured by an injection molding process and may be configured as a combination of at least two brackets for interior front and rear seats. More preferably, in an embodiment of the present disclosure, the bracket unit may include a first bracket 210 that is positioned in a manner that corresponds to the driver seat, a second bracket 220 that is positioned in a manner that corresponds to the passenger seat, a third bracket 230 that is positioned in a manner that corresponds to a rear seat in back of the driver seat, and a fourth bracket 240 that is positioned in a manner that corresponds to a rear seat in back of the passenger seat. Furthermore, four cover cells 110 according to embodiments of the present disclosure may be positioned in such a manner as to correspond to the first to fourth brackets, respectively.

However, in an autonomous vehicle, the division between the driver seat and the passenger seat is ambiguous. In this case, the first bracket 210 may be positioned on one side of the center of the vehicle, and the second bracket 220 may be positioned on the other side in a manner that is adjacent to the first bracket 210.

Figure 2A:
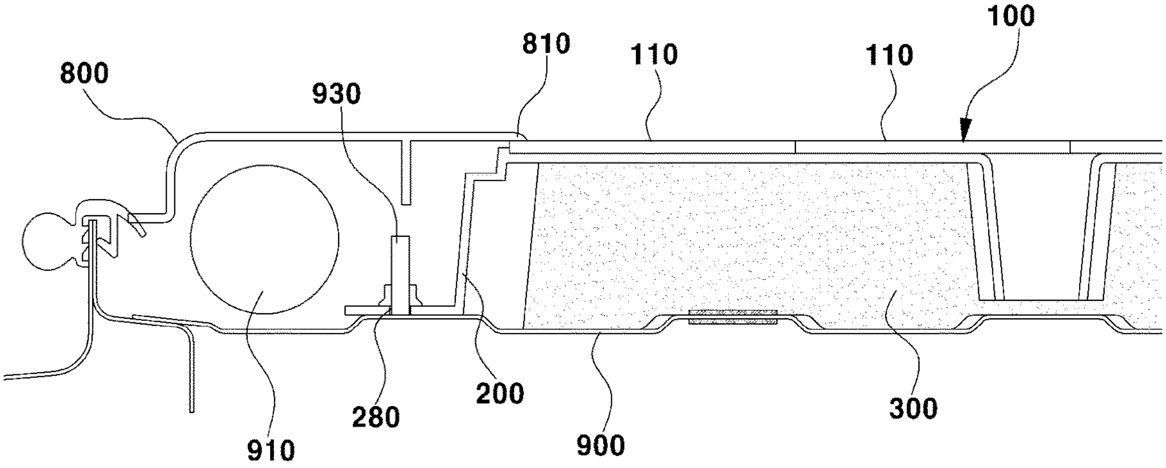
FIG. 2A is a vertical cross-section view illustrating the interior of a vehicle that includes a vehicle hard floor structure according to an embodiment of the present disclosure.

FIG. 2A is a vertical cross-section view illustrating the interior of a vehicle that includes a vehicle hard floor structure 10 according to an embodiment of the present disclosure.

As illustrated, the vehicle hard floor structure 10 includes the bracket unit 200 that is fastened to the floor panel 900 that is part of the interior lower surface of the vehicle. The vehicle hard floor structure 10 includes the sound-absorbing material 300 that is positioned between a lower surface of the bracket unit 200 and an upper surface of the floor panel 900. Furthermore, the vehicle hard floor structure 10 includes the hard cover unit 100, configured as at least one cover cell 110, that is positioned on the upper surface of the bracket unit 200.

A vehicle door may be positioned on both lateral sides of the vehicle hard floor structure 10, and a door scuff 800 is provided on both end portions of the floor panel 900 on which the vehicle door is positioned. The door scuff 800 may be configured in such a manner as to surround at least one portion of an upper surface of the hard cover unit 100. Furthermore, a wiring unit 910 is positioned along the lengthwise direction of the vehicle inside the door scuff 800.

The door scuff 800 includes a soft portion 810 configured to press against the upper surface of the hard cover unit 100.

The soft portion 810 may be coupled to an end portion of the hard cover unit 100 without a change in height, in a state where the hard cover unit 100 and the door scuff 800 are fastened to each other.

Furthermore, the door scuff 800 is configured in such a manner as to be fastened to the bracket unit 200 through a clipping unit 820, so that the bracket unit 200 can be attached and detached.

The upper surface of the floor panel 900 has a bolt structure for fastening to an end portion of the bracket unit 200. More preferably, a multiplicity of brackets may be configured to have respective overlapping regions and thus may be fastened to a single bolt structure.

Figure 2B:
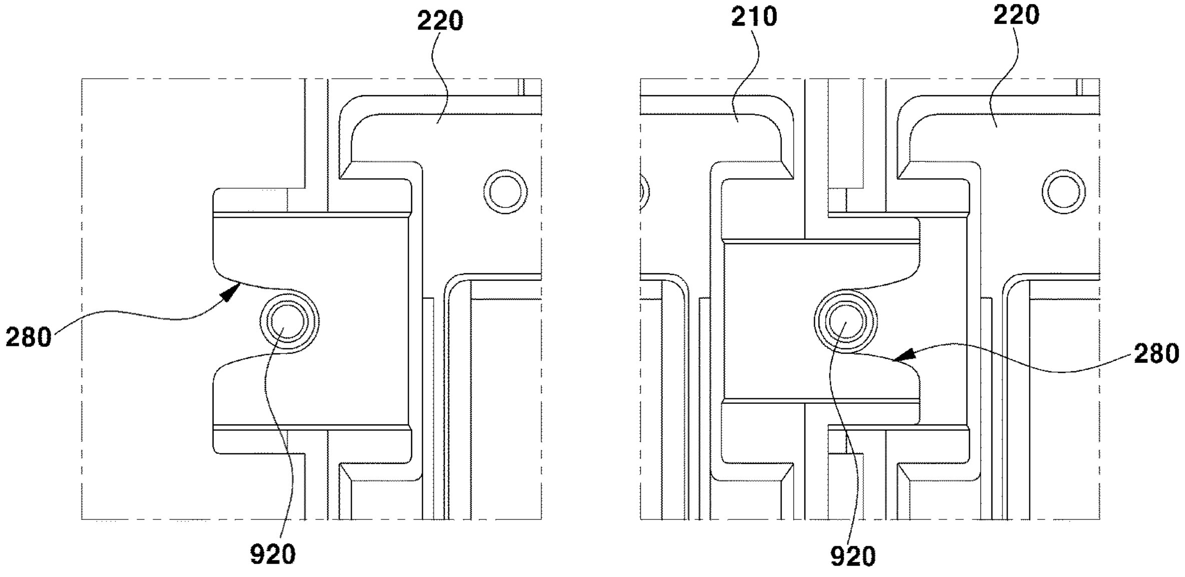
FIG. 2B is a view illustrating a state where bracket units are coupled to each other in the vehicle hard floor structure according to an embodiment of the present disclosure.
Figure 2C:
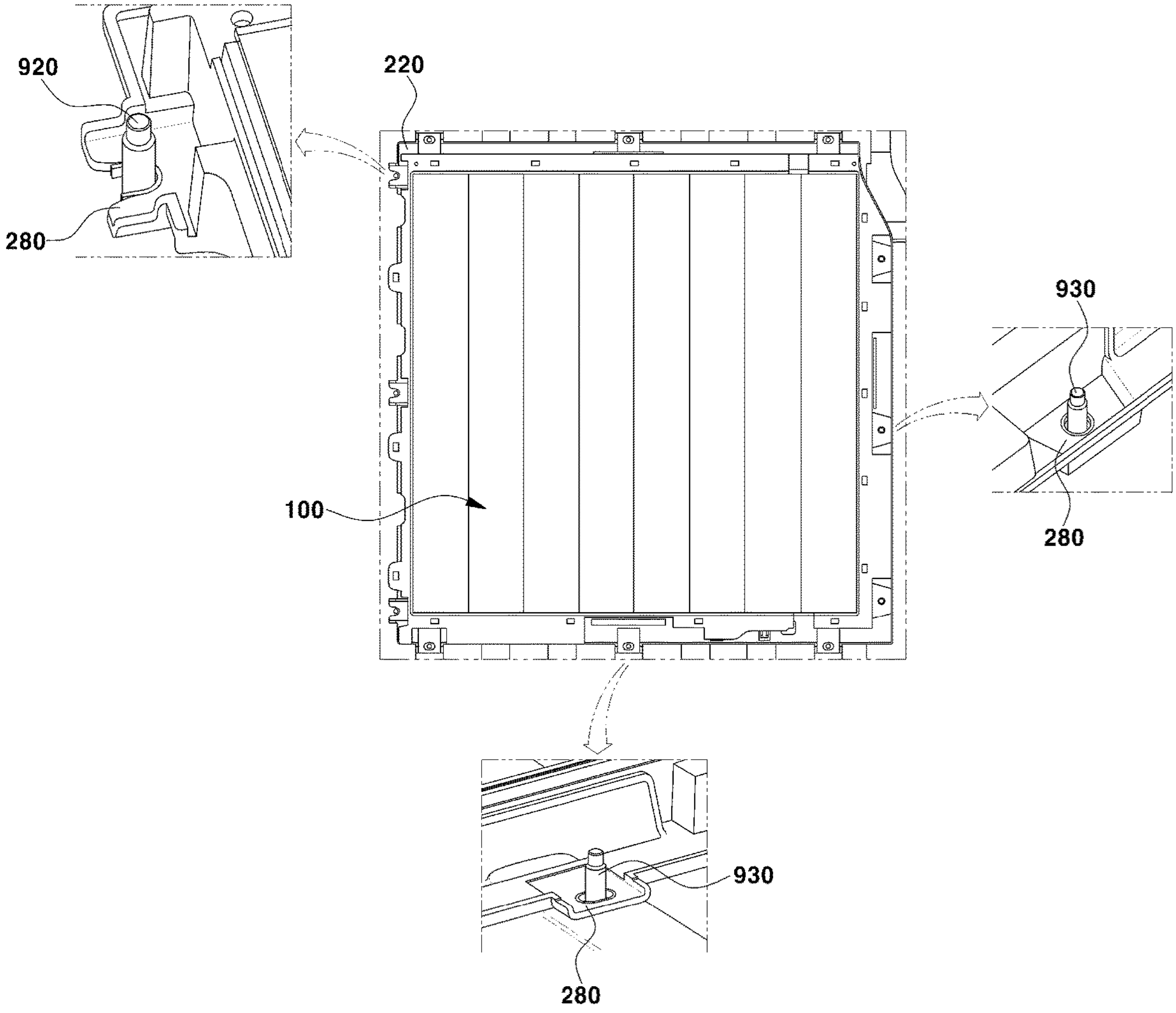
FIG. 2C is a view illustrating a structure where the bracket unit of the vehicle hard floor structure according to an embodiment of the present disclosure and a floor panel are fastened to each other.

In addition, as illustrated in FIGS. 2B and 2C, the vehicle hard floor structure 10 includes a first position fixation rod 920 and a second position fixation rod 930 that are positioned on the upper surface of the floor panel 900 in a manner that protrudes therefrom.

The first position fixation rod 920 is positioned on a portion of the floor panel 900 that the first bracket 210 and the second bracket 220 face and on a portion of the floor panel 900 that the third bracket 230 and the fourth bracket 240 face.

The second position fixation rod 930 is positioned on a portion of the floor panel 900 where the bracket unit 200 faces the door scuff 800 or on a portion of the floor panel 900 that faces both end portions of the outermost surface of the bracket unit 200.

The vehicle hard floor structure 10 further includes a position regulation portion 280 that is positioned on the bracket unit 200 that faces the first position fixation rod 920 and the second position fixation rod 930. The position regulation portions 280 formed on the first bracket 210 and the second bracket 220 are configured to have the shape of the letter "U." They are open at one inner end in order to face the first position fixation rods 920, respectively. Therefore, the second bracket 220 moves in a sliding manner and is fastened to the first position fixation rod 920. Then, the first bracket 210 moves in a sliding manner and is fastened to the first position fixation rod 920 in a manner that overlaps the second bracket 220. In addition, the first bracket 210 and the second bracket 220 move, and both end portions of each of the first bracket 210 and the second bracket 220 are fastened to the second position fixation rods 930, respectively.

Furthermore, the first bracket 210 and the second bracket 220 are positioned on the floor panel 900, and then the fourth bracket 240 moves in a sliding manner and is fastened to the first position fixation rod 920. Thereafter, the third bracket 230 moves in a sliding manner and is fastened to the first position fixation rod 920 in a manner that overlaps the second bracket 220.

At least one of a multiplicity of position regulation portions 280 that face the second position fixation rods 930 is configured as a longitudinal hole to allow movement along the lengthwise direction of the vehicle. More preferably, at least one position regulation portion that is positioned in the first to fourth brackets 210 to 240 may be configured as a longitudinal hole.

Figure 3A:
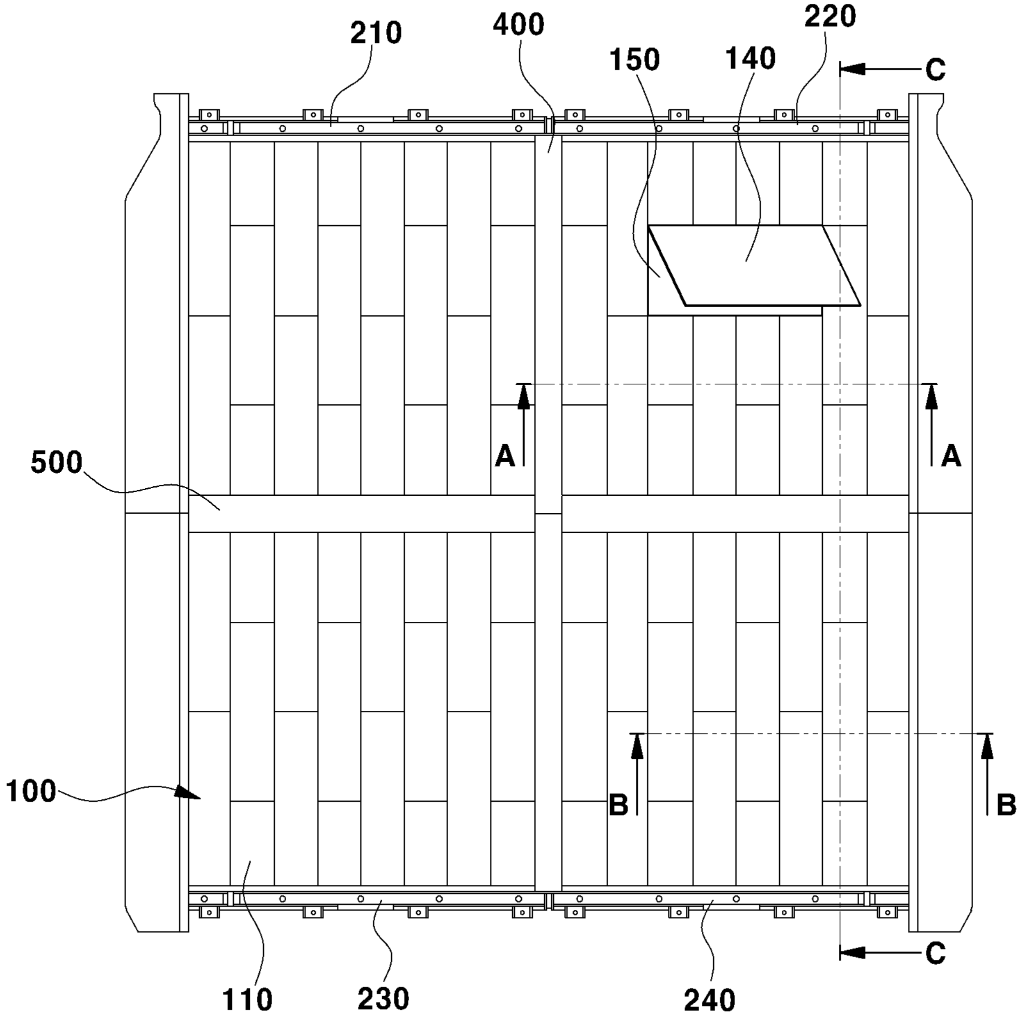
FIG. 3A is a top view illustrating a vehicle hard floor structure according to an embodiment of the present disclosure.

FIG. 3A is a top view illustrating the interior of the vehicle in which the hard cover unit 100 according to an embodiment of the present disclosure is mounted. This view also illustrates regions inside the vehicle where the first bracket 210 to the fourth bracket 240 are respectively positioned.

As illustrated, the hard cover unit 100 may be divided with respect to front and rear seats. Moreover, the hard cover unit 100 may be divided along the widthwise direction of the vehicle. Furthermore, the hard cover unit 100 may be divided along one lateral side (the right end portion or the left end portion) of the vehicle that is close to the driver seat and along the other lateral side (the end portion opposite to one end portion where the driver seat is positioned) that is close to the passenger seat. More preferably, the division into the driver seat and the passenger seat is possible with respect to a center molding portion 400. The division into the front seat and the front seat is possible with respect to an end cover 500.

The center molding portion 400 and the end cover 500 may be configured in such a manner as to be clip-fastened to the bracket unit 200. More preferably, the center molding portion 400 may be fixed by inserting clips positioned on a rear surface of the center molding portion 400 into the first to fourth brackets 210 to 240, respectively. Furthermore, the end cover 500 includes the clips at positions that face the first to fourth brackets 210 to 240, respectively, which constitute the bracket unit 200. The clips may be fixed to the first to fourth brackets 210 to 240, respectively, by being inserted thereinto.

As described above, in the case of the hard cover unit 100 that is divided for the front seat, the rear seat, the driver seat, and the passenger seat, the bracket unit 200 may be positioned under the hard cover unit 100 in a divided manner.

Specifically, the bracket unit 200 may be divided into the first bracket 210 that is formed on a region where the driver seat is positioned, the second bracket 220 that is formed on a region where the passenger seat is positioned, the third bracket 230 that is formed under the rear seat in back of the driver seat, and the fourth bracket 240 that is formed under the rear seat in back of the passenger seat.

In addition, the hard cover unit 100 has an opening portion 140, configured to be open at one end portion, in at least one portion thereof. The opening portion 140 is configured in such a manner that a recess portion 150 formed in a lower portion of the hard cover unit 100 is selectively exposed therethrough.

Furthermore, the opening portion 140 according to an embodiment of the present disclosure may selectively open the recess portion 150 through an open and closing detection sensor and is configured to perform a function of disinfecting the interior of the recess portion 150.

Figure 3B:
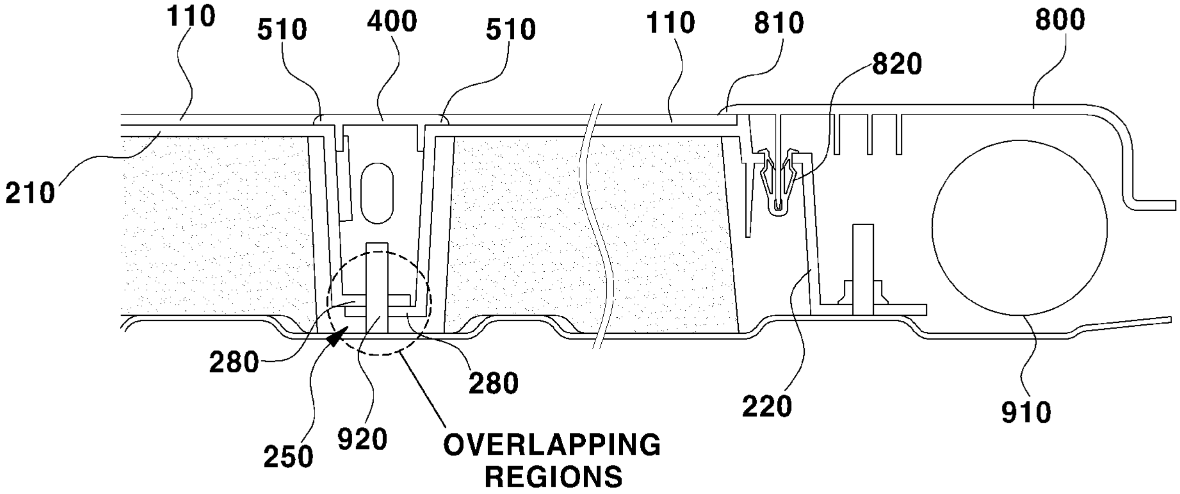
FIG. 3B is a vertical cross-sectional view illustrating a state where a first bracket and a second bracket of the vehicle hard floor structure according to an embodiment of the present disclosure are coupled to each other.

As illustrated in FIG. 3B, which is a cross-sectional view taken along line A-A in FIG. 3A, the first bracket 210 may be assembled after the second bracket 220 is positioned. One portion of the first bracket 210 and one portion of the second bracket 220 have respective overlapping regions. A bolt structure, protruding from the floor panel 900 through the overlapping regions, and the first bracket 210 and the second bracket 220 are integrally fixed. That is, the first bracket 210 is positioned on the upper surface of the floor panel 900 after the second bracket 220. The first bracket 210 and the second bracket 220 are assembled in such a manner that at least one portion of the first bracket 210 comes into contact with the overlapping region of the second bracket 220. Subsequently, through the bolt structure, the floor panel 900, the first bracket 210, and the second bracket 220 are integrally fixed.

For overlapping, ahead of the first bracket 210, the second bracket 220 moves in a sliding manner to the floor panel 900 including the first position fixation rod 920. Then, the first bracket 210 moves in a sliding manner, and thus the first bracket 210 and the second bracket 220 overlap.

Moreover, a center groove 250 is formed between the first bracket 210 and the second bracket 220 and between the third bracket 230 and the fourth bracket 240, and the center molding portion 400 is inserted into the center groove 250. More preferably, according to an embodiment of the present disclosure, the center molding portion 400 is configured in such a manner that one portion thereof is inserted into the center groove 250 formed between the first bracket 210 and the second bracket 220 and between the third bracket 230 and the fourth bracket 240. Accordingly, the hard cover unit 100 and the upper surface of the floor panel 900 may be positioned in parallel with each other.

Figure 3C:
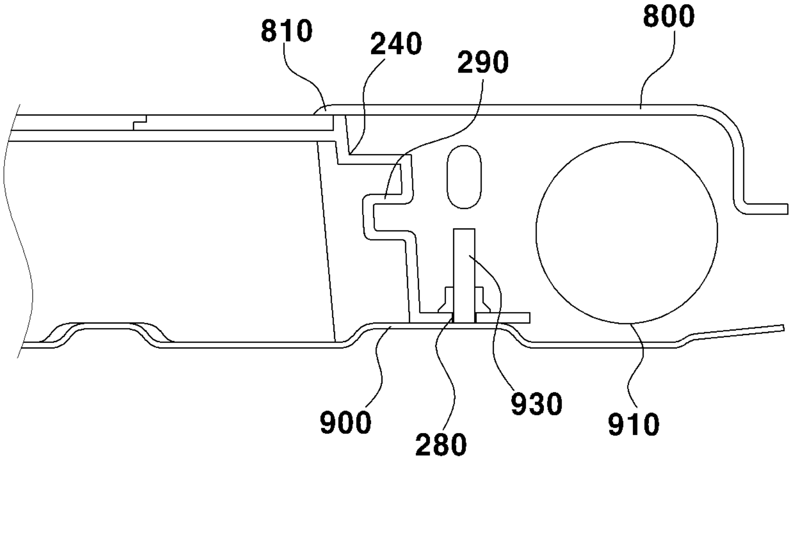
FIG. 3C is a vertical cross-sectional view illustrating a fastening structure of a fourth bracket of the vehicle hard floor structure according to an embodiment of the present disclosure.

FIG. 3C is a cross-section view taken along line B-B in FIG. 3A. FIG. 3C illustrates a coupling relationship of the fourth bracket 240 that is positioned under the rear seat.

According to an embodiment of the present disclosure, ahead of the third bracket 230, the fourth bracket 240 is fixed on the upper surface of the floor panel 900 by being positioned thereon, and the third bracket 230 is fixed by inserting at least one portion of one end portion thereof into the first position fixation rod 920 positioned on the fourth bracket 240.

More preferably, the vehicle hard floor structure may include the first position fixation rod 920. The first position fixation rod 920 is configured to be inserted into respective portions of the first bracket 210, the second bracket 220, the third bracket 230, and the fourth bracket 240 and thus to fix the first bracket 210, the second bracket 220, the third bracket 230, and the fourth bracket 240. These portions are located adjacent to positions that face each other. Therefore, with the first position fixation rods 920, the upper surfaces of the first bracket 210 and the second bracket 220 are fixed by being fastened thereto, and the third bracket 230 and the fourth bracket 240 are fixed by being fastened thereto. Accordingly, with the cover cell 110, the upper surfaces of the first to fourth brackets 210 to 240 form a continuous plane without any gaps between them.

That is, according to an embodiment of the present disclosure, the first position fixation rod 920 positioned adjacent to the bracket positioned is inserted into one end portion of the bracket, thereby fixing the bracket. Accordingly, a state where the brackets are fixed with respect to each other can be maintained, and the cover cell 110 can be positioned on the upper surfaces of the brackets in such a manner as to form a single flat plane.

Furthermore, as illustrated, ahead of the third bracket 230, the fourth bracket is fastened to the floor panel 900, and then the third bracket 230 is assembled to the upper surface of the floor panel 900. At least one portion of the third bracket 230 may be fixed to the fourth bracket 240 thereby being inserted thereinto.

In addition, the fourth bracket 240 is positioned adjacent to the door scuff 800. The fourth bracket 240 is configured in such a manner as to surround at least one portion of the hard cover unit 100, which is positioned on the upper surface of the fourth bracket 240, through the soft portion 810.

Furthermore, the second position fixation rod 930 positioned on the floor panel 900 is inserted into the fourth bracket 240, and thus the fourth bracket 240 is fixed.

In addition, as illustrated, the vehicle hard floor structure 10 includes a handle 290 at the end of the bracket unit 200. The handle 290 is configured in such a manner that a user can handily hold onto the bracket unit 200 therewith. Moreover, the handle 290 may be positioned on each of the brackets 210, 220, 230, and 240. In a case where the brackets 210, 220, 230, and 240 are inserted on the top of the floor panel 900, the handle 290 is configured in such a manner that the door scuff 800 prevents the handle 290 from being exposed to the outside.

Figure 3D:
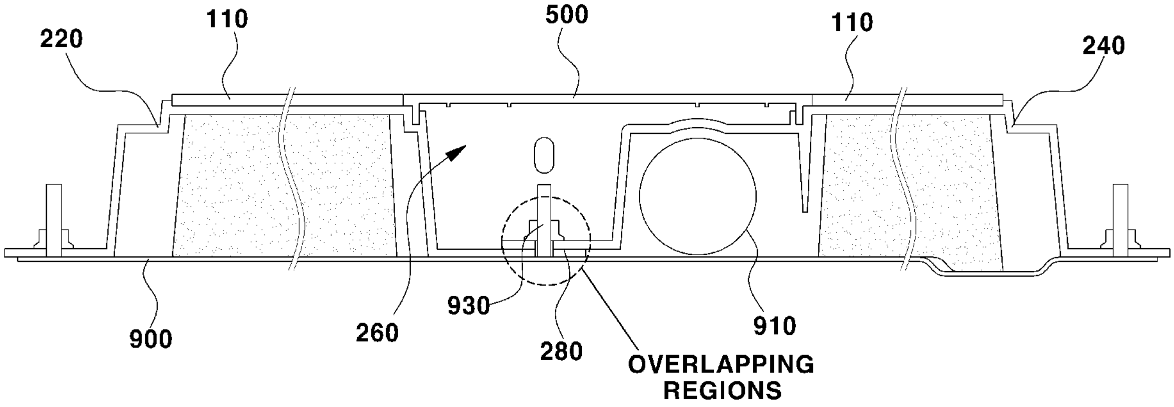
FIG. 3D is a vertical cross-sectional view illustrating a state where the second bracket and the fourth bracket of the vehicle hard floor structure according to an embodiment of the present disclosure are coupled to each other.

FIG. 3D is a cross-sectional view taken in the lengthwise direction of a vehicle floor along line C-C in FIG. 3A.

As illustrated, at least one portion of the fourth bracket 240 is fixed to the floor panel 900 in a state of overlapping at least one portion of an end portion of the second bracket 220. Furthermore, the end cover 500 is configured in such a manner as to be positioned between the fourth bracket and the second bracket 220. Furthermore, the end cover 500 is configured in such a manner that the fourth bracket 240 is positioned on a lower end thereof. The wiring unit 910 that passes through the vehicle in the widthwise direction thereof is positioned under the fourth bracket 240.

The end cover 500 is configured to be inserted into an end groove 260 formed between the second bracket 220 and the fourth bracket 240. An upper surface of the hard cover unit 100 positioned on upper surfaces of the second bracket 220 and the fourth bracket 240 and the upper surface of the end cover 500 are in parallel with each other.

More preferably, the vehicle hard floor structure 10 includes a watertight portion 510 that is formed at a position facing a lateral surface of the hard cover unit 100 on both end portions of the end cover 500. Furthermore, the watertight portion 510 is positioned in such a manner as not to press against the lateral surface of the hard cover unit 100, so that a gap does not occur between the end cover 500 and the hard cover unit 100. The watertight portion 510 may be formed through a double injection process involving the end cover 500 using polyvinyl chloride (PVC). The watertight portion 510 possesses elastic properties and may be fastened at a position that interferes with the hard cover unit 100. The watertight portion 510 may employ a double injection structure involving the end cover 500 or the center molding portion 400.

In this manner, ahead of the fourth bracket 240, the second bracket 220 is assembled to the floor panel 900, and then the fourth bracket 240 is assembled thereto. Accordingly, at least one portion of the fourth bracket 240 overlaps at least one portion of the second bracket 220. Furthermore, the second bracket 220 and the fourth bracket 240 that overlap are fixed by being fastened to a one bolt structure positioned on the floor panel 900.

Furthermore, the first bracket 210 and the third bracket 230 may be configured in such a manner as to be integrally fixed to the floor panel 900. Accordingly, the first bracket 210 is positioned by coming into contact with the floor panel 900, and the third bracket is positioned at a position at which the first bracket 210 comes into contact with the floor panel 900, in such a manner that at least one portion thereof comes into contact with the floor panel 900. Therefore, the first bracket 210 and the third bracket 230 may be integrally fastened to a bolt structure on the floor panel 900.

With reference to FIGS. 3A to 3D, the order in which the bracket unit 200 is assembled to form the vehicle hard floor structure 10 is that ahead of the first bracket 210, the second bracket 220 is fastened to the floor panel 900, the first bracket 210 is fixed to the floor panel 900, and then the fourth bracket 240 and the third bracket 230 are sequentially fixed to the floor panel 900.

More preferably, the second bracket 220 may move in a sliding manner to the first position fixation rod 920, and then the first bracket 210 may move in a sliding manner thereto. In addition, the fourth bracket 240 may move in a sliding manner to the first position fixation rod 920 and may be fastened to the second bracket 220 and the second position fixation rod 930 in an overlapping manner. Subsequently, the third bracket 230 may be fastened to the first position fixation rod 920 in a manner that overlaps the fourth bracket 240 and may be positioned in a manner that overlaps the first bracket 210 and the second position fixation rod 930.

Accordingly, the second bracket 220 and the first bracket 210 have respective overlapping regions, and the fourth bracket 240 and the second bracket 220 have respective overlapping regions. The respective regions are integrally fixed to the floor panel 900. Furthermore, the fourth bracket 240 is fixed to the floor panel 900, and then the third bracket 230 is positioned on the floor panel 900. Accordingly, at least one portion of the third bracket 230 is fixed to the fourth bracket 240 by being inserted thereinto.

Figure 4:
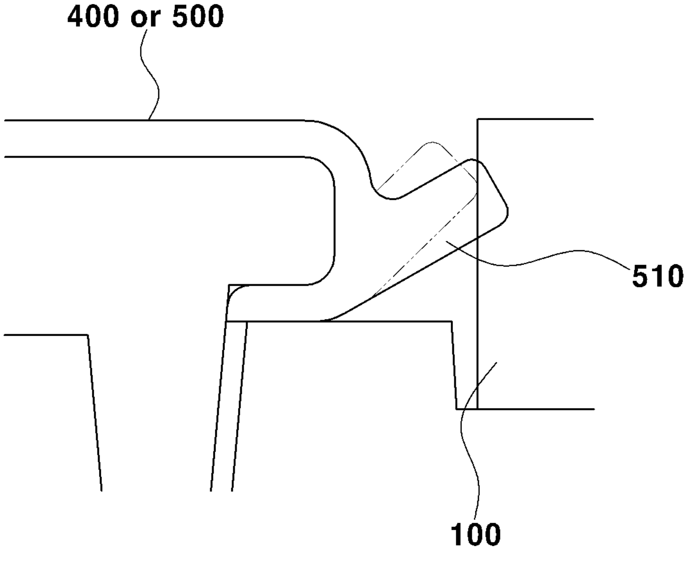
FIG. 4 is an enlarged view of a watertight portion of the vehicle hard floor structure according to an embodiment of the present disclosure.

FIG. 4 is an enlarged view illustrating a configuration of the watertight portion 510 that is formed on both end portions of each of the center molding portion 400 and the end cover 500 according to an embodiment of the present disclosure.

The watertight portion 510 is formed by the double injection process on both end portions facing the hard cover unit 100 of each of the center molding portion 400 and the end cover 500.

The watertight portion 510 may be positioned in a manner that protrudes outward in the widthwise direction of the center molding portion 400 or the end cover 500. Accordingly, the watertight portion 510 is positioned in such a manner as to interfere with the hard cover unit 100 when fastened to the hard cover unit 100. The watertight portion 510 has elastic properties that allow it to move when receiving a tensile force from the hard cover unit 100. This occurs in a case where the center molding portion 400 or the end cover 500 is fastened to the bracket unit 200 in a clipped manner.

More desirably, the watertight portion 510 is formed of polyvinyl chloride (PVC) through a double injection process involving the center molding portion 400 or the end cover 500.

Figure 5:
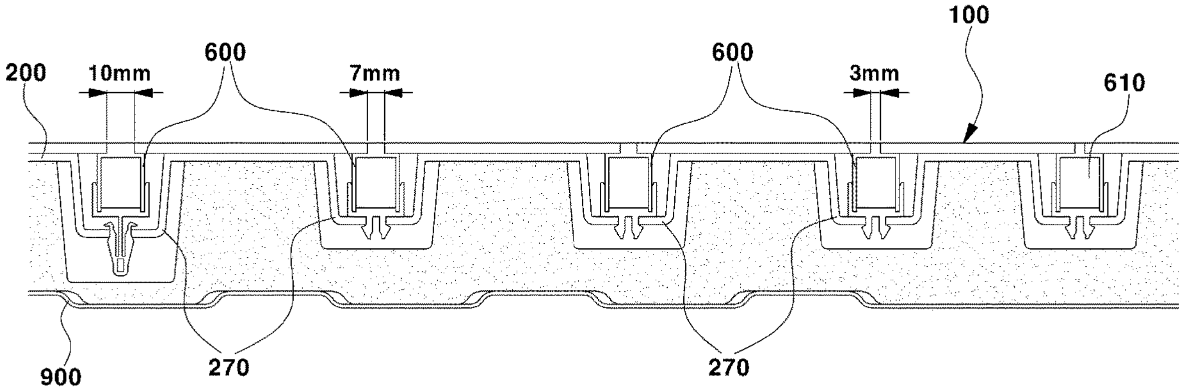
FIG. 5 is a vertical cross-sectional view illustrating a lamp unit formed between cover cells according to an embodiment of the present disclosure.

FIG. 5 is a view illustrating the hard cover unit 100 including a lamp unit 600 according to an embodiment of the present disclosure.

The vehicle hard floor structure includes the bracket unit 200 configured to surround the sound-absorbing material 300 that is positioned on the top of the floor panel 900. The bracket unit 200 has at least one groove 270 formed between the cover cells 110 of the hard cover unit 100. The vehicle hard floor structure includes at least one lamp unit 600 inside the groove 270. The lamp unit 600 is inserted into the groove 270 formed in the bracket unit 200 along the horizontal direction according to an arrangement of the cover cells 110.

Furthermore, taking into consideration the lamp unit 600 inserted into the groove 270, the cover cells 110 may be formed in such a manner that a gap therebetween varies according to a preset value. Therefore, the lamp unit 600 may be configured to emit light according to the gap between the cover cells 110. Furthermore, the hard cover unit 100 is configured so that at least a portion thereof is positioned in the gap between the cover cells 110, through which the upper surface of the lamp unit 600 is exposed. Accordingly, the gap between the cover cells 110 can be set in a variable manner.

According to an embodiment of the present disclosure, the gap between the cover cells 110 may be set to a range of 3 mm to 10 mm in such a manner that the lamp unit 600 emits light.

Furthermore, the vehicle hard floor structure includes at least one pressure sensor 610 under a lower surface of the cover cell 110. Accordingly, in a case where a pressure that is at or above a reference value is applied, electric power is applied to the lamp unit 600, thereby emitting light.

According to an embodiment, the pressure sensor 610 may be positioned on each of the cover cells 110. The pressure sensor 610 may be configured in such a manner that, in a case where a pressure that is at or above the reference value is applied to the cover cell 110, the lamp unit 600 adjacent to the cover cell 110 emits light.

In another implementation example, the pressure sensor 610 may be under the lateral end portion of the cover cells that are adjacent to the vehicle door. In a case where a pressure that is at or above the reference value is applied to the cover cell 110, the lamp unit 600 can be turned on in response to a welcome mode.

Furthermore, the lamp units 600 positioned under the cover cells 110 may be configured to have respective LEDs having different colors. In a case where the pressure sensor 610 makes a request to the lamp units 600 for turning on, the lamp units 600 positioned under the cover cells 110, respectively, may be controlled in such a manner as to be sequentially turned on. In addition, the lamp units 600 having different colors may be configured in such a manner that they are sequentially turned on in a preset order or in such a manner that two or several of them are at the same time turned on in a preset order.

In this manner, the technique of turning on the lamp unit 600, which is disclosed in the present embodiment, is determined according to a preset value. The turning-on technique and order are not limited to the ones in the present embodiment.

Furthermore, the lamp unit 600 according to embodiments of the present disclosure may be configured using a light guide. Indirect light may be provided to the hard cover unit 100 through an LED unit positioned on the vehicle.

Figure 6:
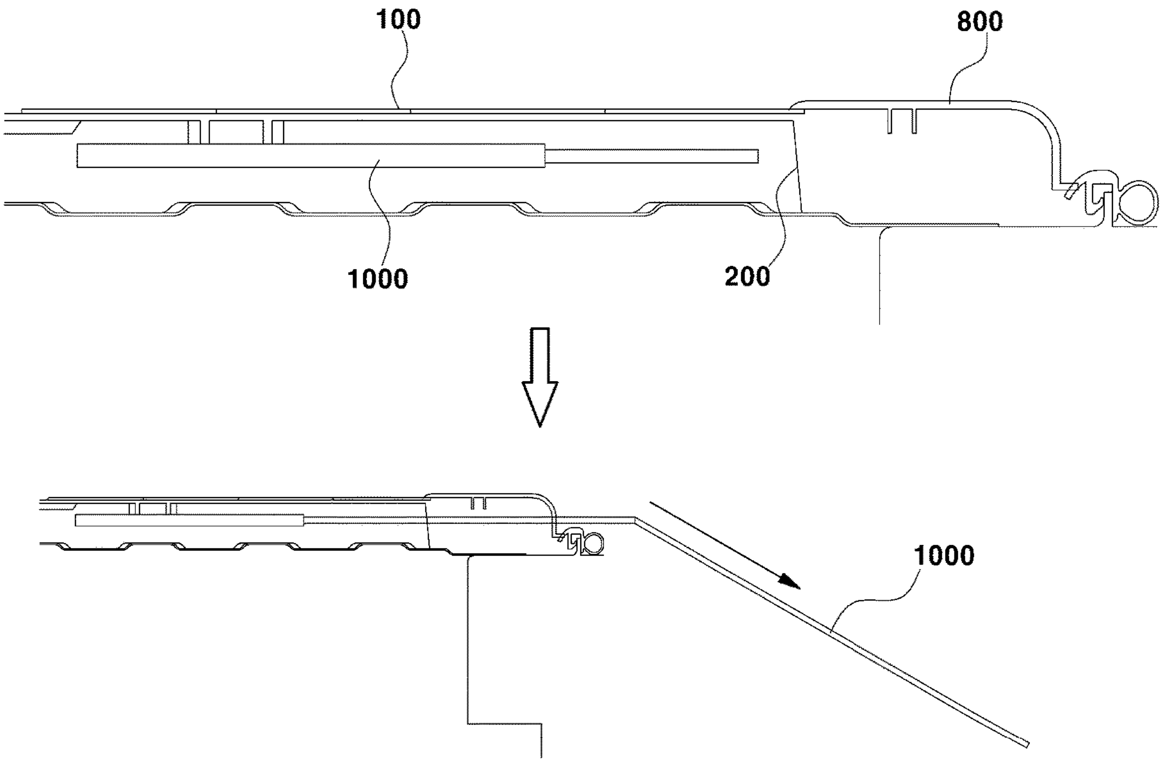
FIG. 6 is a view illustrating a structure of a ramp that protrudes toward a lateral surface of the bracket unit according to an embodiment of the present disclosure.

FIG. 6 is a side view illustrating a vehicle hard floor structure 10 according to an embodiment of the present disclosure, which includes a ramp 1000.

The bracket unit 200 is fastened adjacent to the door scuff 800. The vehicle hard floor structure 10 further includes the ramp 1000 that is positioned by being inserted into a space in the bracket unit 200. The ramp 1000 is configured in such a manner as to selectively protrude outward. Accordingly, the ramp 1000 protrudes out of the vehicle.

The ramp 1000 may be configured in such a manner as to obliquely protrude by a predetermined angle. More preferably, two plates are positioned on the ramp 1000 by being fastened thereto. The plate positioned adjacent to the door scuff 800 may first protrude out of the vehicle. That is, ahead of the other plate positioned inside the door scuff 800, the plate protruding outward may be inclined between the vehicle and the ground.

The preceding plate may be inserted into the following plate and then may selectively protrude. At the request of the user, with a drive force of a drive unit, the preceding plate and the following plate may integrally move in the widthwise direction or may be manually pushed out of the vehicle.

Furthermore, the ramp 1000 may protrude in the widthwise direction of the vehicle along a rail (not illustrated) formed on the bracket unit 200. Accordingly, the ramp 1000 is positioned out of the vehicle according to the user's selection.

Figure 7A:
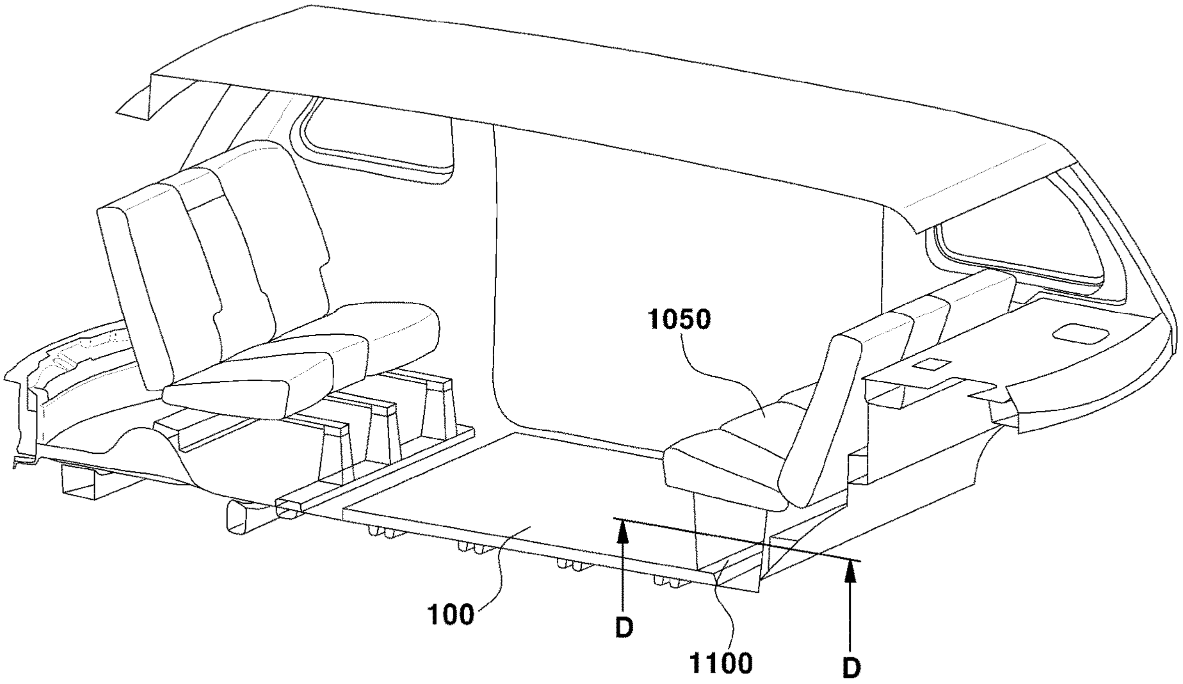
FIGS. 7A and 7B are views each illustrating a luggage tray that is formed under a seat positioned adjacent to one lateral side of the vehicle.
Figure 7B:
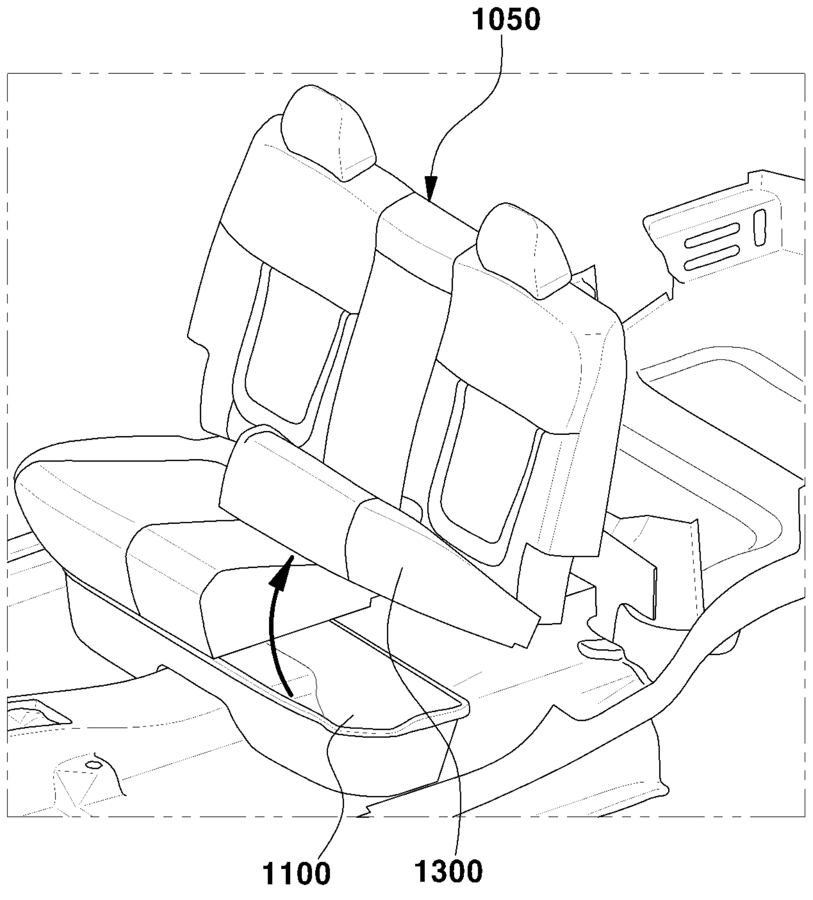
Figure 7C:
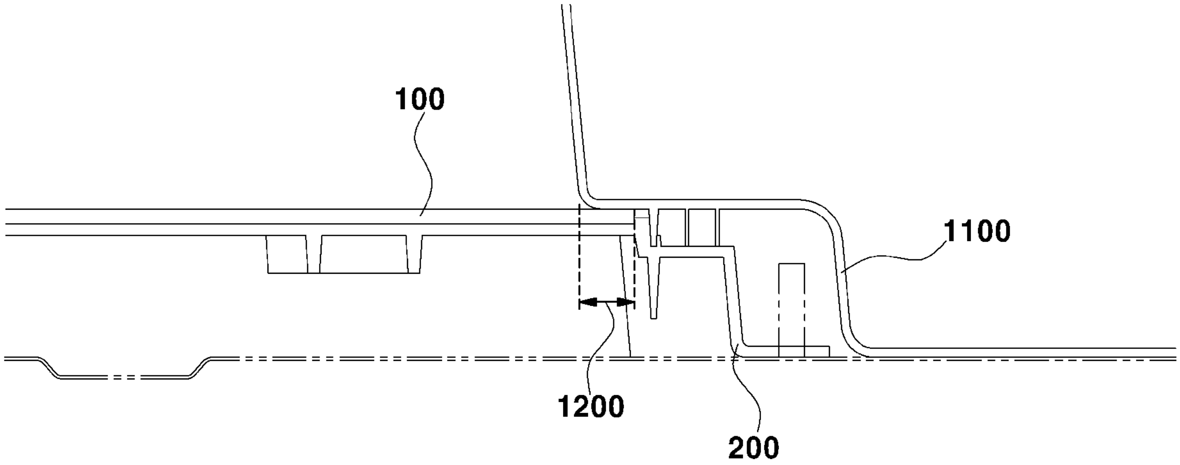
FIG. 7C is a cross-sectional view taken along line D-D in FIG. 7A.

FIGS. 7A and 7B are views each illustrating a luggage tray 1100 that is formed under a seat positioned adjacent to one lateral side of the vehicle. FIG. 7C is a cross-sectional view taken along line D-D in FIG. 7A.

According to embodiments of the present disclosure, the vehicle hard floor structure 10 may include the luggage tray 1100 under the seat. The vehicle hard floor structure 10 includes the bracket unit 200 and the hard cover unit 100 that overlap at least one portion of the luggage tray 1100. That is, the vehicle hard floor structure 10 includes that the bracket unit 200 and the hard cover unit 100 that are inserted into one end portion, adjacent to the interior of the vehicle, of the luggage tray 1100.

As illustrated in FIGS. 7A and 7B, in the case of a vehicle in which a tilt up seat 1050 is installed, the vehicle hard floor structure includes the luggage tray 1100 that is positioned under a seat cushion. The luggage tray 1100 is configured as an injection-molded bracket in such a manner as to form a predetermined space under the seat cushion 1300. Furthermore, as illustrated in FIG. 7C, a front end portion of the luggage tray 1100 that is configured as the injection-molded bracket is positioned in a manner that overlaps a lower end portion of the luggage tray 1100, and the luggage tray 1100 and the bracket unit are fastened to each other. Furthermore, the hard cover unit 100 that is positioned on the upper surface of the bracket unit 200 may be positioned by being inserted between the luggage tray 1100 and the bracket unit 200.

Therefore, as illustrated in FIG. 7C, the luggage tray 1100 is positioned on the upper surface of the bracket unit 200. The hard cover unit 100 is inserted in the lengthwise direction into a gap formed between the luggage tray 1100 and the bracket unit 200. Thus, the luggage tray 1100 and the hard cover unit 100 have respective overlapping regions 1200.

Embodiments of the present disclosure are described in detail above in an exemplary manner. In addition, the preferred embodiments of the present disclosure are described as being sufficiently specific to enable one skilled in the art to practice the present disclosure. Various different modifications to the preferred embodiments of the present disclosure and various different combinations thereof may possibly be made under various conditions. Modifications or alterations would possibly be made to the preferred embodiments, as disclosed in the present specification, of the present disclosure within the scope of the concept of the present disclosure, the scope of equivalents of the disclosed contents, and/or the scope of the technology or knowledge in the art. The preferred embodiments described above satisfy an optimal requirement for realizing the technical idea of the present disclosure. Various modifications to the embodiments, which are required in the field in which the present disclosure finds application and which are required to use the present disclosure, are possible as well. Therefore, the preferred embodiments, as disclosed in detail above, of the present disclosure are not intended to impose any limitation on the present disclosure. In addition, the following claims should be construed as covering other embodiments as well.

What is claimed is:

1. A hard floor structure for a vehicle, the structure comprising:

a bracket fastened to a floor panel, wherein the bracket comprises a first bracket and a second bracket arranged adjacent to each other, wherein a portion of the first bracket and a portion of the second bracket define respective overlapping regions, and wherein a fastener structure extends through the overlapping regions to secure the first bracket and the second bracket relative to the floor panel;

a hard cover positioned on a top surface of the bracket, the hard cover comprising cover cells that are plate-shaped and exposed to an interior of the vehicle; and a sound-absorbing material disposed between the bracket and the floor panel.

2. The structure of claim 1, further comprising a clipping device positioned on a region of a door scuff that the bracket faces.

3. The structure of claim 2, wherein the door scuff includes a soft portion surrounding a portion of an upper surface of the hard cover.

4. The structure of claim 1, further comprising a handle disposed on first and second ends of the bracket.

5. The structure of claim 1, wherein the bracket and the floor panel are coupled to each other in a hook-and-loop fastening manner.

6. The structure of claim 1, wherein the sound-absorbing material comprises expanded polypropylene.

7. The structure of claim 1, further comprising:

a recess portion disposed in a lower portion of the hard cover; and an opening portion positioned in the hard cover on a top of the recess portion.

8. The structure of claim 1, further comprising a ramp disposed between the bracket and the floor panel, the ramp being extendable out of the vehicle.

9. The structure of claim 1, further comprising a luggage tray disposed under a seat disposed in the vehicle, wherein the hard cover is disposed between the luggage tray and the bracket by insertion therebetween.

10. A hard floor structure for a vehicle, the structure comprising:

a bracket device fastened to a floor panel, wherein the bracket device comprises:

a first bracket disposed on a first region corresponding to a driver seat;

a second bracket disposed on a second region corresponding to a passenger seat;

a third bracket disposed on a third region corresponding to a seat in back of the driver seat; and a fourth bracket disposed on a fourth region corresponding to a seat in back of the passenger seat;

a hard cover positioned on a top surface of the bracket device, the hard cover comprising cover cells that are plate-shaped and exposed to a vehicle interior; and a sound-absorbing material disposed between the bracket device and the floor panel, wherein the first bracket and the second bracket are arranged adjacent to each other, wherein a portion of the first bracket and a portion of the second bracket define respective overlapping regions, and wherein a fastener structure extends through the overlapping regions to secure the first bracket and the second bracket relative to the floor panel.

11. The structure of claim 10, wherein the hard cover comprises a center molding portion inserted in a center groove, the center groove being disposed between the first bracket and the second bracket and between the third bracket and the fourth bracket.

12. The structure of claim 11, wherein the hard cover further comprises an end cover inserted in an end groove, the end groove being disposed between the first bracket and the second bracket that are disposed under the driver seat and the passenger seat and disposed between the third bracket and the fourth bracket that are disposed under the seat in back of the driver seat and the seat in back of the passenger seat.

13. The structure of claim 12, further comprising a watertight portion, wherein the end cover is disposed on both end portions of the watertight portion facing the bracket device in such a manner as to be disposed adjacent lateral surfaces of the bracket device.

14. The structure of claim 11, further comprising a watertight portion, wherein the center molding portion is disposed on both end portions of the watertight portion facing the bracket device in such a manner as to be disposed adjacent lateral surfaces of the bracket device.

15. The structure of claim 10, further comprising:

a first position fixation rod disposed on the floor panel facing the bracket device;

a second position fixation rod disposed on the floor panel at a position at which the bracket device faces a door scuff; and position regulation portions disposed on the brackets of the bracket device fastened to the first position fixation rod and the second position fixation rod.

16. The structure of claim 15, wherein the first position fixation rod is insertable into the position regulation portion of the first bracket and the position regulation portion of the second bracket in an overlapping manner.

17. The structure of claim 15, wherein the position regulation portion that is fastened to the first position fixation rod is open at a first end and is movable in a sliding manner for fastening.

18. The structure of claim 15, wherein the position regulation portion that is fastened to the second position fixation rod is configured as a longitudinal hole along a lengthwise direction of the vehicle.

19. A vehicle comprising:

a vehicle body comprising a floor panel;

vehicle doors coupled to the vehicle body at lateral sides of the vehicle body;

a plurality of brackets fastened to the floor panel, wherein each bracket of the plurality of brackets comprises:

a first bracket and a second bracket arranged adjacent to each other, wherein a portion of the first bracket and a portion of the second bracket define respective overlapping regions, and wherein a fastener structure extends through the overlapping regions to secure the first bracket and the second bracket relative to the floor panel;

a hard cover positioned on a top surface of the brackets, the hard cover comprising cover cells that are plate-shaped and exposed to an interior of the vehicle;

a sound-absorbing material disposed between the brackets and the floor panel; and vehicle seats disposed in the interior of the vehicle above the brackets.

20. The vehicle of claim 19, wherein the brackets and the floor panel are coupled to each other in a hook-and-loop fastening manner.

* * * * *